United States Patent
Nam et al.

(10) Patent No.: US 9,575,463 B2
(45) Date of Patent: *Feb. 21, 2017

(54) APPARATUS AND METHOD FOR FAST GENERATION OF THREE-DIMENSIONAL (3D) HOLOGRAM

(71) Applicant: Samsung Electronics Co., Ltd., Suwon-si (KR)

(72) Inventors: Dong Kyung Nam, Yongin-si (KR); Ho Cheon Wey, Seongnam-si (KR); Seok Lee, Hwaseong-si (KR); Du Sik Park, Suwon-si (KR); Ju Yong Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/741,934

(22) Filed: Jun. 17, 2015

(65) Prior Publication Data

US 2015/0286186 A1    Oct. 8, 2015

Related U.S. Application Data

(63) Continuation of application No. 13/686,078, filed on Nov. 27, 2012, now Pat. No. 9,081,363.

(30) Foreign Application Priority Data

Jan. 25, 2012 (KR) .................. 10-2012-0007210

(51) Int. Cl.
    *G03H 1/08* (2006.01)
    *G03H 1/20* (2006.01)
    *G03H 1/22* (2006.01)

(52) U.S. Cl.
    CPC .............. *G03H 1/0808* (2013.01); *G03H 1/20* (2013.01); *G03H 1/2294* (2013.01); *G03H 2001/0825* (2013.01); *G03H 2001/205* (2013.01); *G03H 2210/30* (2013.01); *G03H*
(Continued)

(58) Field of Classification Search
CPC ...... G03H 1/20; G03H 1/04; G03H 2001/306; G03H 1/0276; G03H 2210/40
(Continued)

(56) References Cited

U.S. PATENT DOCUMENTS 7,636,184 B2    12/2009    Schwerdtner
2010/0073744 A1    3/2010    Zschau et al.
2011/0019249 A1    1/2011    Leister

FOREIGN PATENT DOCUMENTS

CN        1711509 A    12/2005
CN     101014911 A    8/2007
(Continued)

OTHER PUBLICATIONS

Xiaojie Zhang, et al., "Computer-generated holograms for 3D objects using the fresnel zone plate", Proceedings of SPIE, vol. 5636, Feb. 2005, pp. 109-115.
(Continued)

*Primary Examiner* — Jade R Chwasz
(74) *Attorney, Agent, or Firm* — NSIP Law

(57) ABSTRACT

An apparatus for generating a hologram that may generate a three-dimensional (3D) hologram pattern at a high speed may include a pattern setting unit to set points for which hologram patterns are to be generated with respect to a one-eighth area of an entire area for which a hologram pattern is to be generated, a calculation unit to calculate pattern values for a plurality of reference points selected with respect to the one-eighth area of the entire area, and to generate a pattern for the one-eighth area using recurrent interpolation, and a pattern duplicating unit to complete a pattern for the entire area by duplicating the generated pattern for the one-eighth area.

17 Claims, 23 Drawing Sheets

(52) U.S. Cl.
CPC ............. 2210/452 (2013.01); *G03H 2223/23* (2013.01); *G03H 2226/02* (2013.01); *G03H 2240/61* (2013.01)

(58) Field of Classification Search
USPC ...................................................... 359/9, 12
See application file for complete search history.

(56) References Cited

FOREIGN PATENT DOCUMENTS

| | | |
|---|---|---|
| CN | 101458822 A | 6/2009 |
| KR | 10-1999-0053070 A | 7/1999 |
| KR | 10-2008-0086309 | 9/2008 |
| KR | 10-2009-0011973 A | 2/2009 |
| KR | 10-2010-0024939 A | 3/2010 |
| KR | 10-0973031 B1 | 7/2010 |

OTHER PUBLICATIONS

Do-woo Kwon, et al., "Hardware Implementation of N-LUT Method Using Field Programmable Gate Array Technology", Practical Holography XXV: Materials and Applications, Feb. 2011, pp. 1-8.

Seung-Cheol Kim et al., "Computational approaches for fast generation of digital 3D video holograms", Chinese Optics Letters, vol. 7, No. 12, Dec. 2009, pp. 1083-1091.

Extended European Search Report dated May 8, 2013 in corresponding European Patent Application No. 13152298.9.

Zhang, Xiaojie. "Study on Some Relevant Issues of the Holographic Display System Based on the LCD Spatial Light Modulator." *Full-text Database of Chinese Doctoral Dissertations* (7 pages with English translation).

Chinese Office Action issued on Aug. 10, 2016 in counterpart Chinese Application No. 201310027577.7. (24 pages with English Translation).

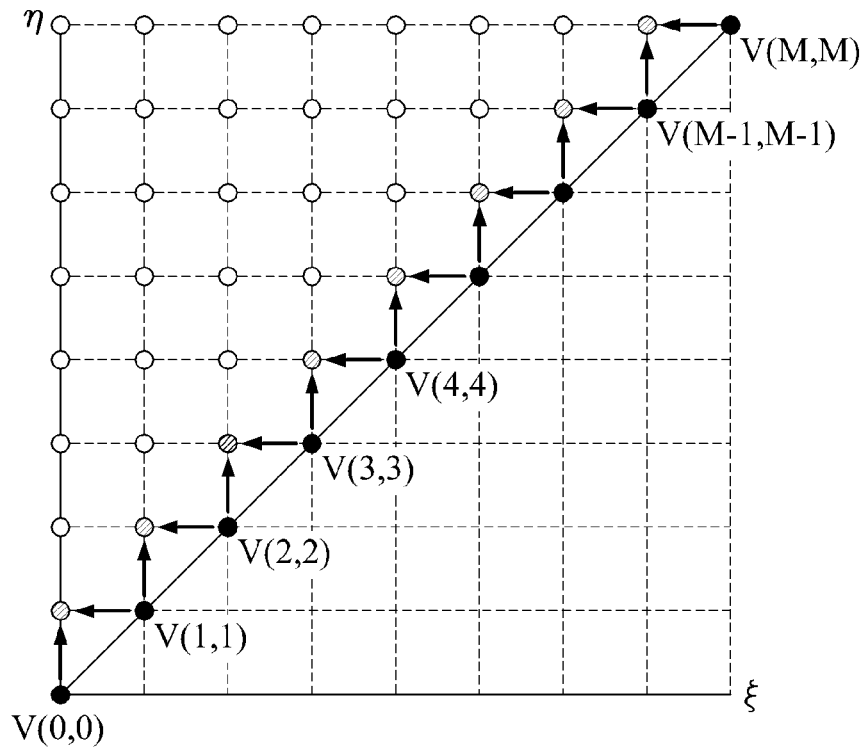

Iteration 1

Iteration 2

Iteration 3

Iteration 4

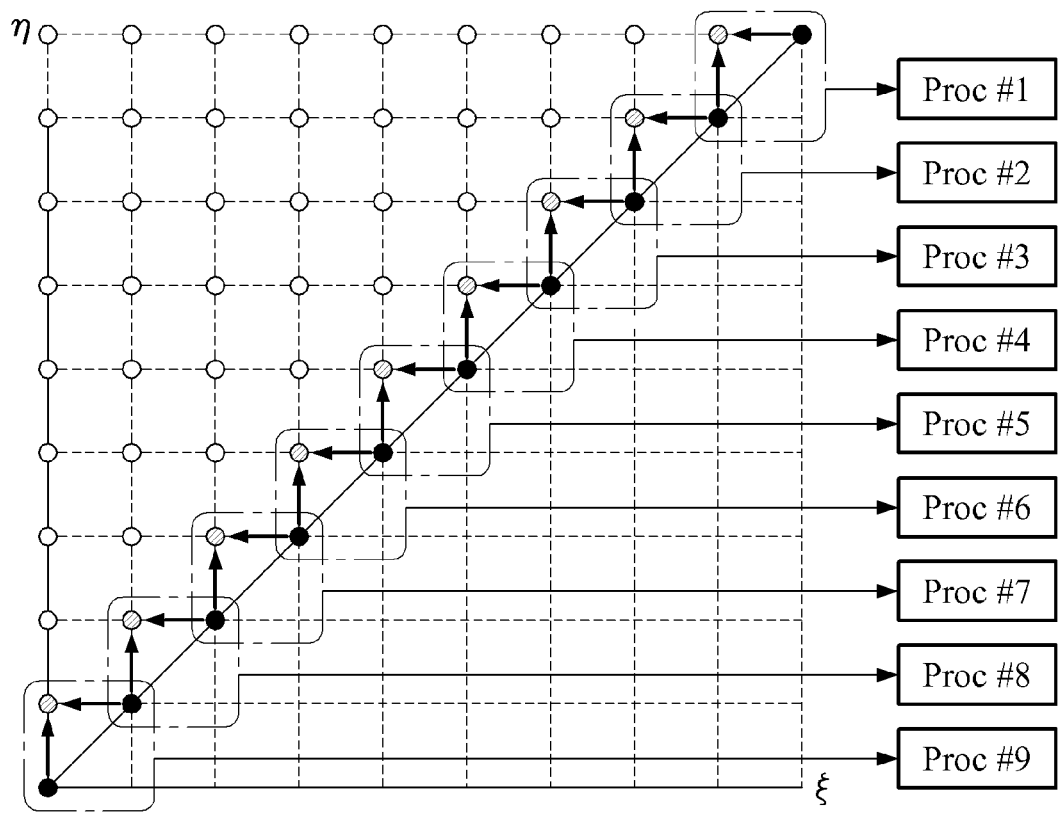

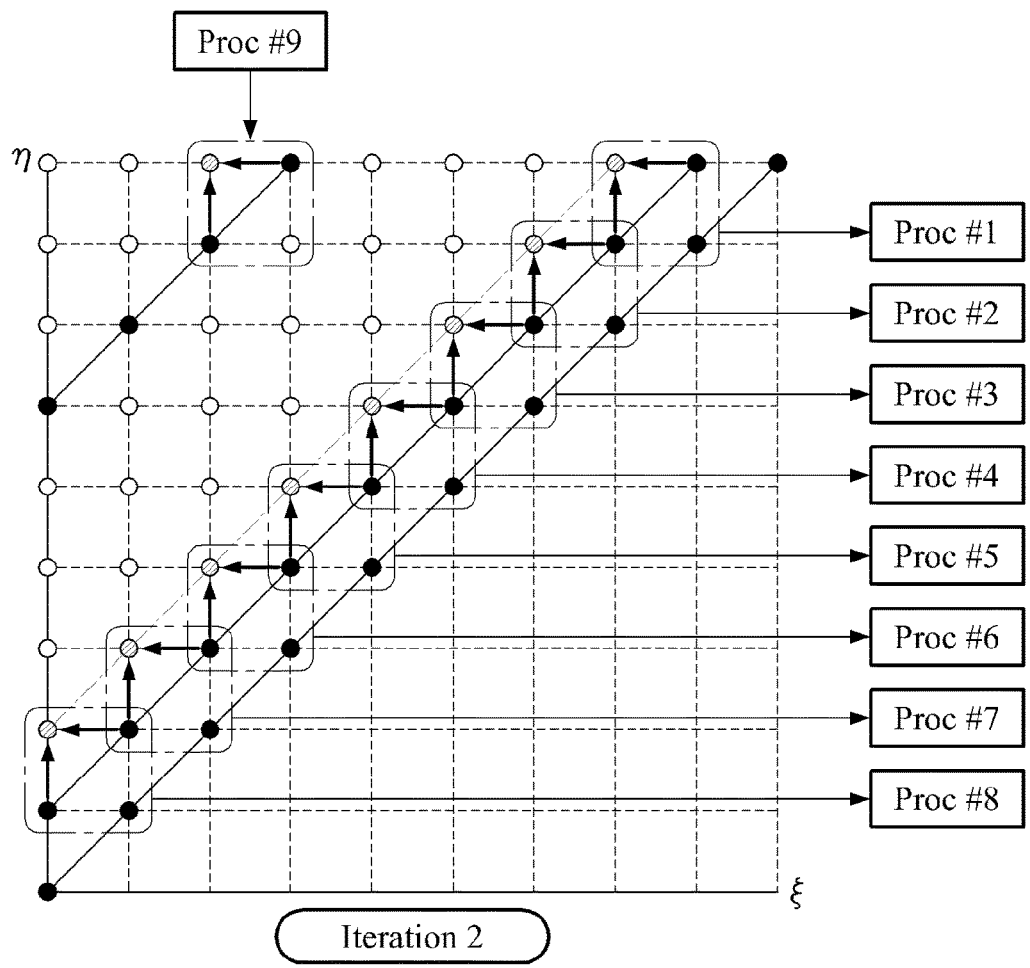

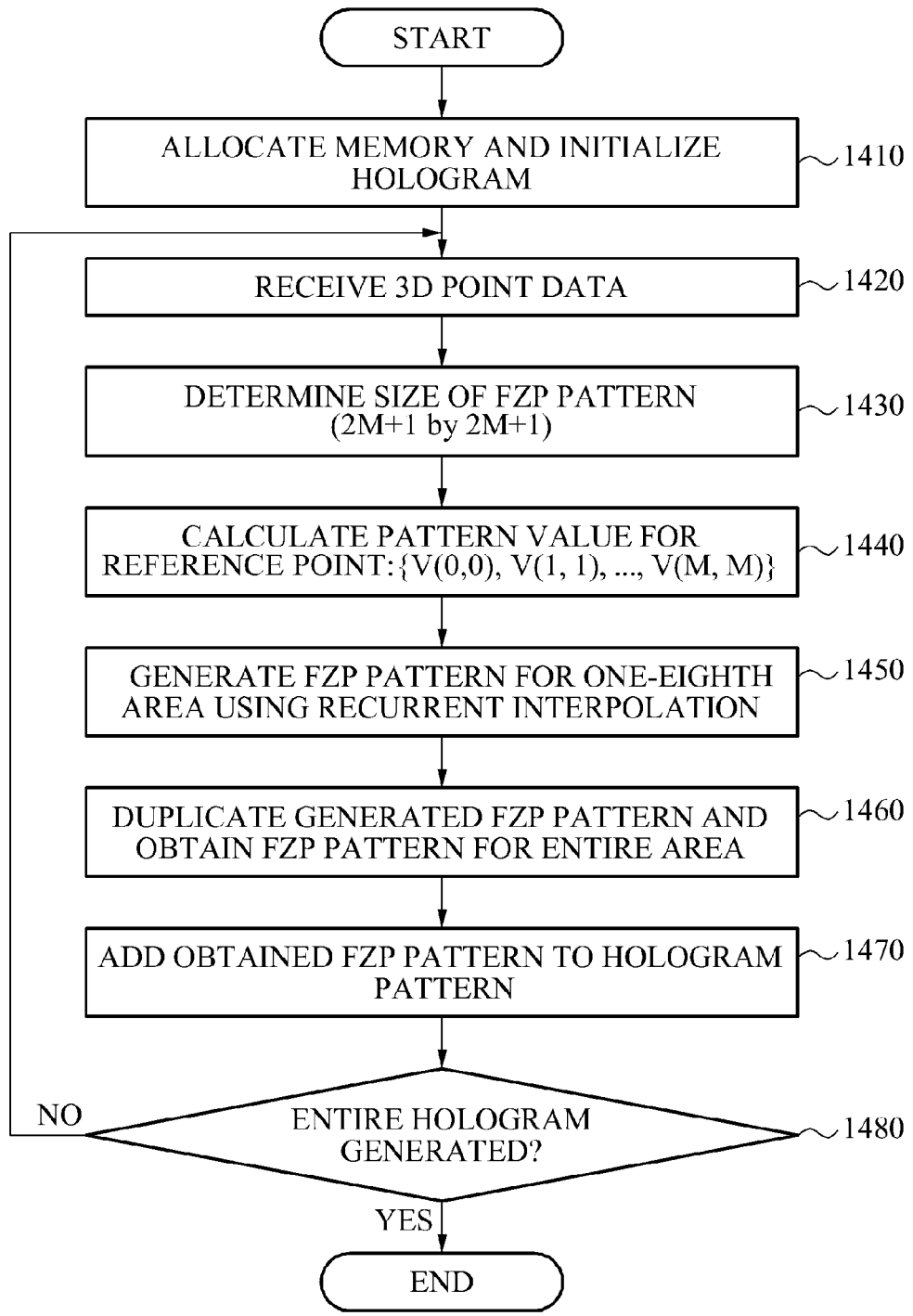

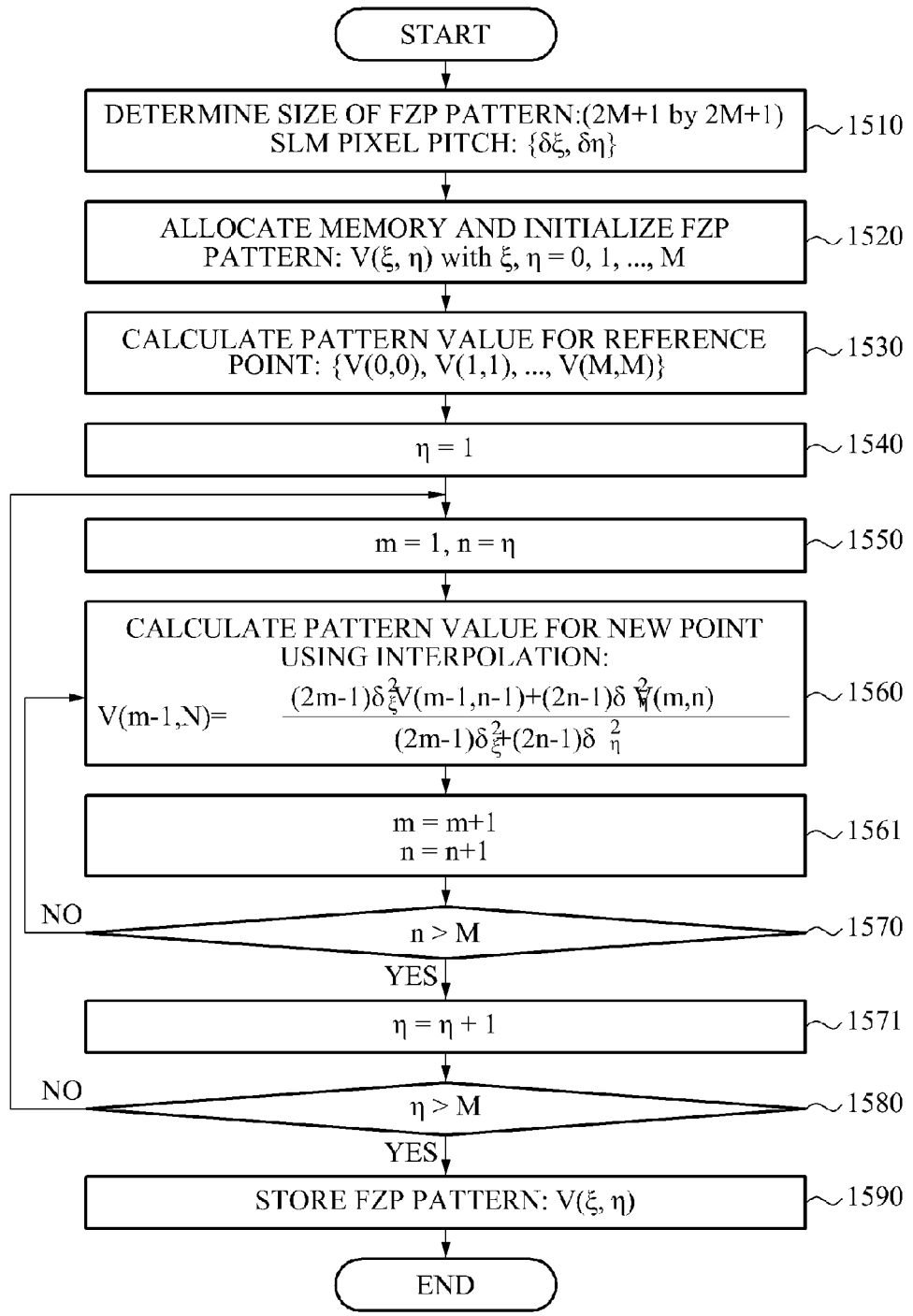

APPARATUS AND METHOD FOR FAST GENERATION OF THREE-DIMENSIONAL (3D) HOLOGRAM

CROSS-REFERENCE TO RELATED APPLICATIONS

This application is a continuation of U.S. application Ser. No. 13/686,078 filed Nov. 27, 2012, which claims the priority benefit of Korean Patent Application No. 10-2012-0007210, filed on Jan. 25, 2012, in the Korean Intellectual Property Office, the disclosure of which is incorporated herein by reference.

BACKGROUND

1. Field

The following description relates to an apparatus and method of expediting generation of a three-dimensional (3D) hologram, and more particularly, to a method and apparatus for generating a hologram pattern using an operational apparatus by receiving an input of data of a spatial object or image data including color and depth.

2. Description of the Related Art

A stereoscopic image is provided to realize a three-dimensional (3D) image. However, since the stereoscopic image has a limit due to visual fatigue, a limited number of view points, and the like, a method of realizing a 3D image using a hologram is drawing attention.

A hologram is technology for representing a 3D space that has a limitless number of viewpoints and causes little visual fatigue by reproducing a 3D spatial object using a strength and phase of light. Generally, a hologram is generated using a computer generated hologram (CGH) in a method of generating a digital hologram. That is, in the digital hologram generating method, optical signals are approximated, and a hologram is generated using an interference pattern generated through a mathematical operation.

In the digital hologram generating method, a 3D spatial object is construed as a set of 3D points, and point holograms corresponding to all 3D points constituting the 3D spatial object are generated. In this instance, as the sophistication or complexity of the 3D spatial object increases so too does a number of 3D points included in the 3D spatial object, and thus, an amount of calculation subsequently increases.

SUMMARY

According to example embodiments, an apparatus and method of generating a hologram that may expedite generation of a three-dimensional (3D) hologram are disclosed.

According to example embodiments, an apparatus and method that may expedite generation of a 3D hologram, without relying on a separate look-up table (LUT), are disclosed.

According to example embodiments, an apparatus and method of generating a hologram that may be suitable for a parallel process using multiple processors, and may minimize an operational delay resulting from external memory access, are disclosed.

The foregoing and/or other aspects are achieved by providing an apparatus for generating a hologram, the apparatus including a calculation unit to generate a pattern for a partial area by recurrent interpolation using input 3D data, the partial area corresponding to a portion of an entire area for which a hologram pattern is to be generated, and a pattern duplicating unit to complete a pattern for the entire area by duplicating the generated pattern for the partial area.

The partial area may correspond to a one-eighth area of the entire area.

The calculation unit may calculate Fresnel Zone Plate (FZP) pattern values for a plurality of reference points in the partial area, and may calculate FZP pattern values for points excluding the plurality of reference points in the partial area, by performing interpolation using an FZP pattern value calculated for at least one point, among the plurality of reference points.

In this instance, the calculation unit may calculate FZP pattern values for the plurality of reference points, using a solution of a wave equation, for example, a Rayleigh-Sommerfeld solution.

The calculation unit may include a plurality of processors to perform parallel recurrent interpolation, and the apparatus may further include a scheduling unit to perform scheduling for the parallel recurrent interpolation with respect to the plurality of processors.

The apparatus may further include a pattern setting unit to select the partial area from the entire area, and to determine a size of a pattern in the partial area.

The foregoing and/or other aspects are achieved by providing an apparatus for generating a hologram, the apparatus including a pattern setting unit to set points at which a hologram pattern is to be generated with respect to a one-eighth area of an entire area for which a hologram pattern may be generated, and a calculation unit to calculate pattern values for a plurality of reference points selected in the one-eighth area of the entire area, and to generate a pattern for the one-eighth area by a recurrent interpolation scheme, based on the calculated pattern values for the plurality of reference points.

In this instance, the apparatus may further include a pattern duplicating unit to complete a pattern for the entire area by duplicating the generated pattern for the one-eighth area.

The calculation unit may calculate FZP pattern values for the plurality of reference points, using a solution of a wave equation.

The calculation unit may include a plurality of processors to perform parallel recurrent interpolation, and the apparatus may further include a scheduling unit to perform scheduling for the parallel recurrent interpolation with respect to the plurality of processors.

The foregoing and/or other aspects are achieved by providing a method of generating a hologram, the method include generating, by a calculation unit of a hologram generating apparatus, a pattern for a partial area by recurrent interpolation using input 3D data, the partial area corresponding to a portion of an entire area for which a hologram pattern is to be generated, and completing, by a pattern duplicating unit of the hologram generating apparatus, a pattern for the entire area by duplicating the generated pattern for the partial area.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIGS. 8 and 9A through 9D illustrate a process of recurrent interpolation according to example embodiments;

FIGS. 11A and 11B illustrate operational states of processors of FIG. 8 according to example embodiments;

FIG. 14 illustrates a method of generating a hologram according to example embodiments; and FIG. 15 illustrates recurrent interpolation in a method of generating a hologram according to example embodiments.

DETAILED DESCRIPTION

Figure 1:
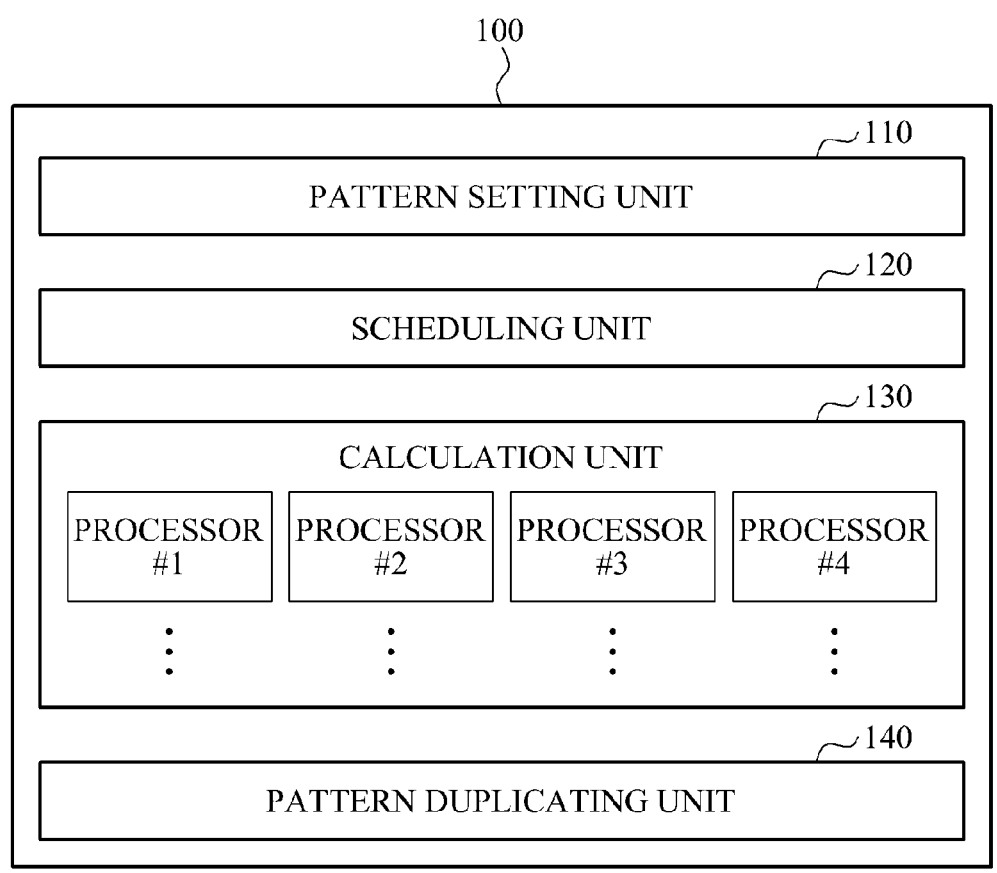
FIG. 1 illustrates an apparatus for generating a hologram according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates an apparatus 100 for generating a hologram according to example embodiments.

When memory allocation and hologram initialization are performed, and 3D point data is received by the apparatus 100, a process of generating a three-dimensional (3D) hologram image may be initiated.

A pattern setting unit 110 may set a size of a Fresnel Zone Plate (FZP) pattern, which is an interval of a point for which a pattern value may be calculated, by determining a size of a pattern. A shape of the pattern and a size of the pattern will be further described with reference to FIGS. 2 through 6.

A calculation unit 130 may calculate pattern values for reference points in order to directly calculate a pattern value for a one-eighth area, and also may calculate pattern values for other points in the one-eighth area, using recurrent interpolation.

A scheduling unit 120 may perform scheduling to minimize a number of idle processors and a number of processing iterations when processors included in the calculation unit 130 calculate the pattern values through recurrent interpolation.

The scheduling process will be further described with reference to FIGS. 11 through 13.

Through the aforementioned processes, the calculation unit 130 may complete the pattern for the one-eighth area, and a pattern duplicating unit 140 may complete a pattern for the entire area by duplicating the completed pattern for the one-eighth area throughout the entire area.

The process of duplicating the pattern will be further described with reference to FIG. 10.

Figure 2:
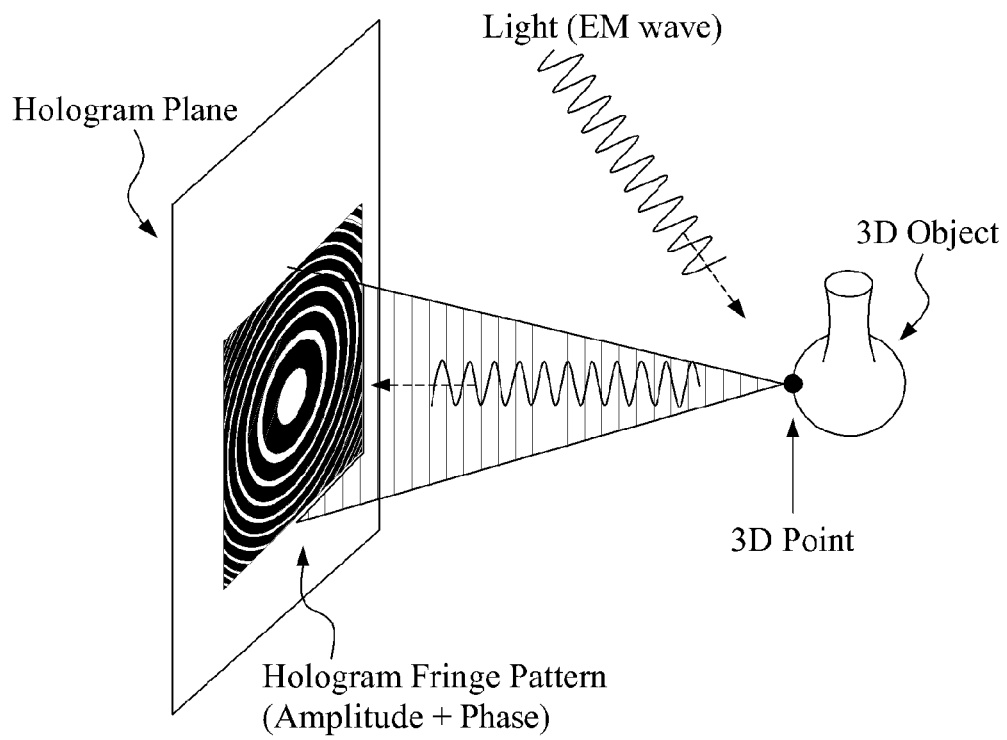
FIG. 2 illustrates a process of generating a hologram according to example embodiments.

FIG. 2 illustrates a process of generating a hologram according to example embodiments.

A hologram may refer to technology for restoring a 3D image identical to an original image, by recording and reproducing phase information and intensity of light, that is, an electromagnetic (EM) wave, in a space.

In a case of a computer generated hologram, a hologram pattern may generally be generated based on information about a 3D space and an object, in order to directly capture phase information and intensity of light, due to such difficulties as maintenance of darkroom environment, control of short-wavelength light, or management of movements of an object, for example.

However, because intensity and phase information on a hologram plane may need to be calculated for all spatial points, a great amount of time may be expended in generating a hologram. Typically, thousands to tens of thousands of seconds are expended in generating a single piece of a hologram.

Example embodiments may expedite an operational process in the process of generating the hologram.

Figure 3:
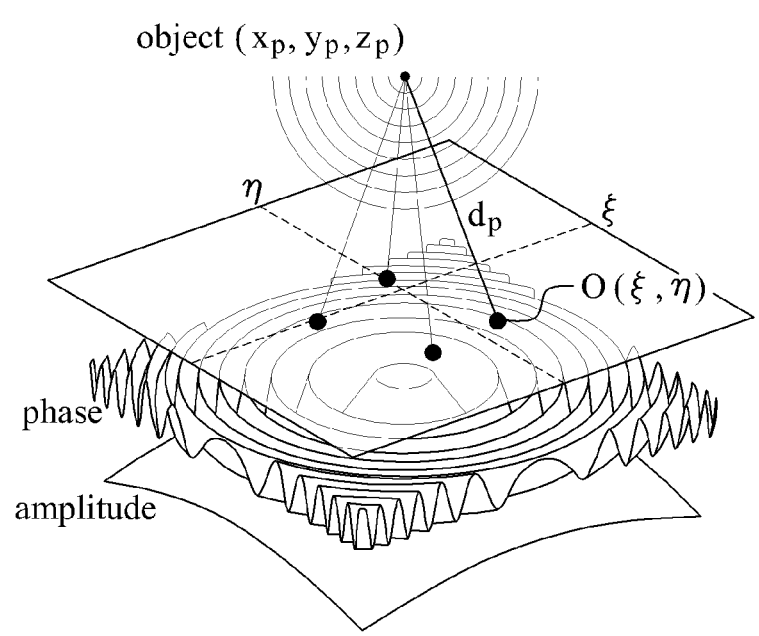
FIG. 3 illustrates a calculating process of an apparatus for generating a hologram according to example embodiments.

FIG. 3 illustrates a calculating process of an apparatus for generating a hologram according to example embodiments.

According to example embodiments, a hologram pattern may be generated using a solution of a wave equation. For example, a 3D hologram may be obtained by generating a hologram pattern for a one-eighth area corresponding to a portion of an entire area, using a Rayleigh-Sommerfeld solution, hereinafter referred to as an R-S solution, as expressed by Equation 1, and generating a pattern for the entire area by duplicating the generated hologram pattern for the one-eighth area over the entire area.

In the process of generating the pattern for the one-eighth area, pattern values for only a portion of reference points may be calculated, and pattern values for other points excluding the reference points may be calculated using recurrent interpolation.

[Equation 1]
$$O(\xi, \eta) = \sum_{p=1}^{N} \frac{a_p}{d_p} \exp\{j(kd_p + \phi_p)\}$$

with original phase (bias), phase modulation at $(\xi, \eta, 0)$, amplitude modulation at $(\xi, \eta, 0)$.

Terms $d_p$ and $k$ in Equation 1 may be defined as expressed by Equations 2 and 3, respectively.

$$d_p = \sqrt{(\xi - x_p)^2 + (\eta - y_p)^2 + z_p^2} \quad \text{[Equation 2]}$$

$$k = \frac{2\pi}{\lambda} \quad \text{[Equation 3]}$$

The R-S solution may be approximated using binominal expansion as follows.

In particular, if Equation 4 is true, then $d_p$ may be calculated by Equation 5.

$$\rho^2 = (\xi - x_p)^2 + (\eta - y_p)^2 \text{ (from Equation 2)} \quad \text{[Equation 4]}$$

-continued $$d_p = \sqrt{\rho^2 + z_p^2} \quad \text{[Equation 5]}$$
$$= z_p \sqrt{\left(\frac{\rho}{z_p}\right)^2 + 1}$$
$$\approx z_p \left(1 + \frac{\rho^2}{2z_p^2}\right)$$
$$= z_p + \frac{\rho^2}{2z_p}$$

Accordingly, an approximation of the R-S solution may be expressed by Equation 6.

$$\tilde{O}(\xi, \eta) = \sum_{p=1}^{N} \frac{a_p}{d_p} \exp(j\phi_p) \exp(jkx_p) \exp\left(jk \frac{(\xi - x_p)^2 + (\eta - y_p)^2}{2z_p}\right) \quad \text{[Equation 6]}$$

Figure 4:
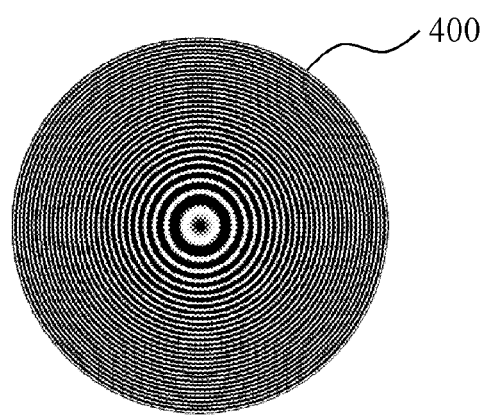
FIG. 4 illustrates a hologram pattern generated according to example embodiments.

Initial phase
Depth phase
Hologram plane phase (Term to induce change in phase on a hologram plane)
Constant phase on a hologram plane FIG. 4 illustrates a hologram pattern 400 generated according to example embodiments.

As can be understood from the hologram pattern 400 for an entire area and the approximation of Equation 6, a hologram pattern to be generated at portions that are located a predetermined distance away from a predetermined point may be concentrically symmetric. Accordingly, in view of concentric symmetry elimination, an FZP pattern for only a one-eighth area may be generated without generating all patterns for the entire area one by one, and the generated pattern for the one-eighth area may be duplicated for remaining areas, whereby a pattern for the entire area may be obtained.

That is, when the concentric symmetry of the hologram pattern is used, pattern values for one-dimensional (1D) points may be calculated directly through $\rho = \sqrt{(\xi - x_p)^2 + (\eta - y_p)^2}$ of Equation 2, and patterns for other points corresponding to ($\xi$, $\eta$) may be obtained indirectly by using the pre-calculated pattern values.

Figure 5:
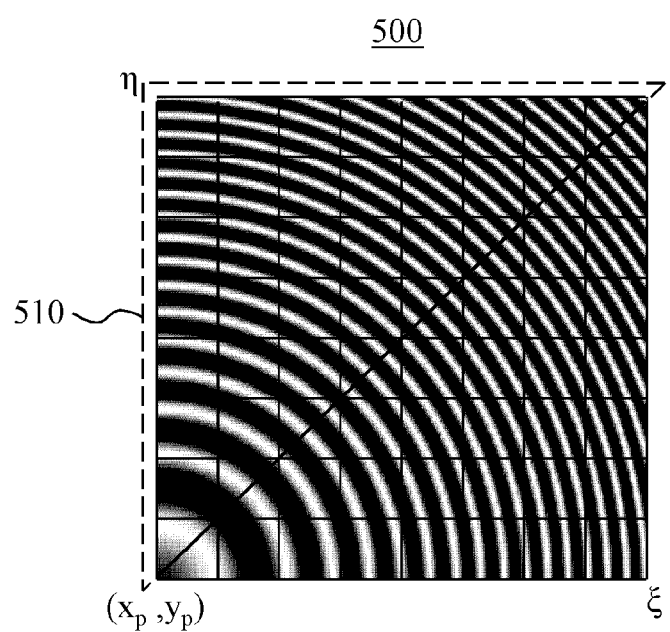
FIG. 5 illustrates a process of generating a pattern according to example embodiments.

FIG. 5 illustrates a conceptual diagram 500 to describe a process of generating a pattern according to example embodiments.

As aforementioned, when an FZP pattern for a one-eighth area 510 is generated, an FZP pattern for a quarter area as shown in the conceptual diagram 500 may be generated by duplicating the generated FZP pattern for the one-eighth area 510. By iteratively duplicating the generated FZP pattern for the quarter area, an FZP pattern for an entire area may be generated.

When the FZP pattern is generated for the one-eighth area 510, patterns for only points present on a 1D line in a single predetermined direction may be generated, without generating patterns for all points in the one-eighth area 510, and the FZP pattern for the one-eighth area 510 may be generated through recurrent interpolation.

In this instance, a look-up table (LUT) containing a correlation between 1D pattern data and radius data may be used.

A value P according to the radius data may be pre-calculated in the LUT, and patterns for uncalculated portions may be determined directly by referring to the LUT table, based on calculations performed with respect to the 1D pattern data.

However, when a resolution of a hologram to be displayed increases, a size of the LUT may increase, an amount of time required for external memory access may increase, and a large amount of data may need to be stored in a global memory. Accordingly, a plurality of processors may experience difficulty in performing parallel processes.

Thus, according to example embodiments, a hologram pattern for the one-eighth area 510 may be generated by directly calculating only 1D pattern data, without using an LUT of radius data, and rapidly calculating data for other portions through recurrent interpolation.

Figure 6A:
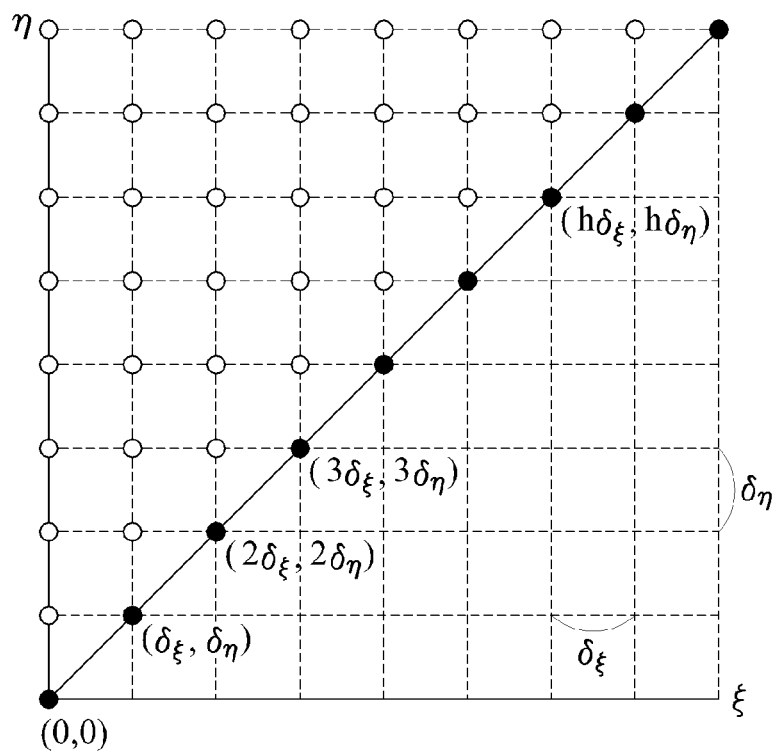
FIGS. 6A and 6B illustrate reference points for which pattern values are pre-calculated in recurrent interpolation according to example embodiments.
Figure 6B:
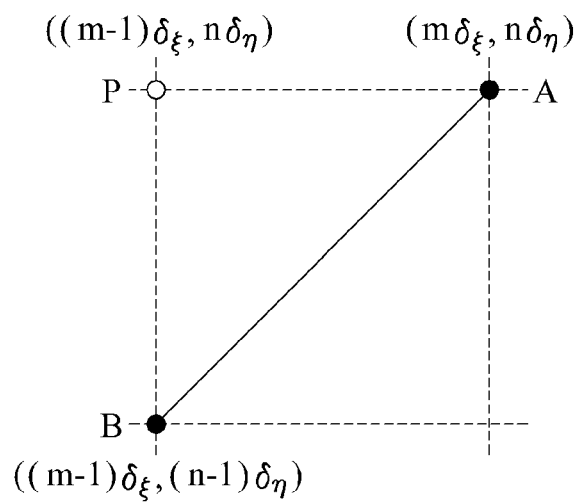

FIGS. 6A and 6B illustrate reference points for which pattern values are pre-calculated according to example embodiments.

For ease of description, it may be assumed that $x_p=0$, $y_p=0$ in coordinates ($x_p$, $y_p$) of a point corresponding to the center of a pattern having concentric symmetry. The assumption may not be problematic since relative coordinates and absolute coordinates may be readily interchangeable.

A pattern value at the origin corresponding to $x_p=0$, $y_p=0$ may be calculated based on Equation 6, as expressed by Equation 7.

$$\tilde{O}(\xi, \eta) = \sum_{p=1}^{N} \frac{a_p}{d_p} \exp(j\phi_p) \exp(jkx_p) \exp\left(jk \frac{\xi^2 + \eta^2}{2x_p}\right) \quad \text{[Equation 7]}$$

→ Variable phase distance

In Equation 7, a value in (the dashed box) may be referred to as a variable phase distance (VPD). According to the aforementioned concentric symmetry, when the VPD is identical, a pattern may have an identical phase on a holographic plane.

Although an R-S solution may be calculated along a diagonal line, the R-S solution may not necessarily be calculated along the diagonal line. Instead, initial R-S solutions may be calculated for points on a suitable 1D line, or a portion of predetermined reference points, depending on applications.

The calculating process may be performed in real time using the calculated initial values for the reference points. Depending on example embodiments, the calculated initial values may be used as an LUT.

Among the reference points of FIGS. 6A and 6B, namely, solid black points corresponding to points for which pattern values are calculated, let a position of a reference point at ($n\delta_\epsilon$, $m\delta_\eta$) be A, a position of a reference point at (($n-1)\delta_\epsilon$, $n\delta_\eta$) be B, and a position of a reference point at (($m-1)\delta_\epsilon$, $n\delta_\eta$) be P. A VPD at each position may be calculated as expressed by Equations 8 through 10, respectively.

$$d_{m,n} = \frac{(m\delta_\xi)^2 + (n\delta_\eta)^2}{2z_p} \quad \text{[Equation 8]}$$

$$d_{m-1,n-1} = \frac{((m-1)\delta_\xi)^2 + ((n-1)\delta_\eta)^2}{2z_p} \quad \text{[Equation 9]}$$

-continued $$d_{m-1,n} = \frac{((m-1)\delta_\xi)^2 + (n\delta_\eta)^2}{2z_p}$$ [Equation 10]

Figure 7:
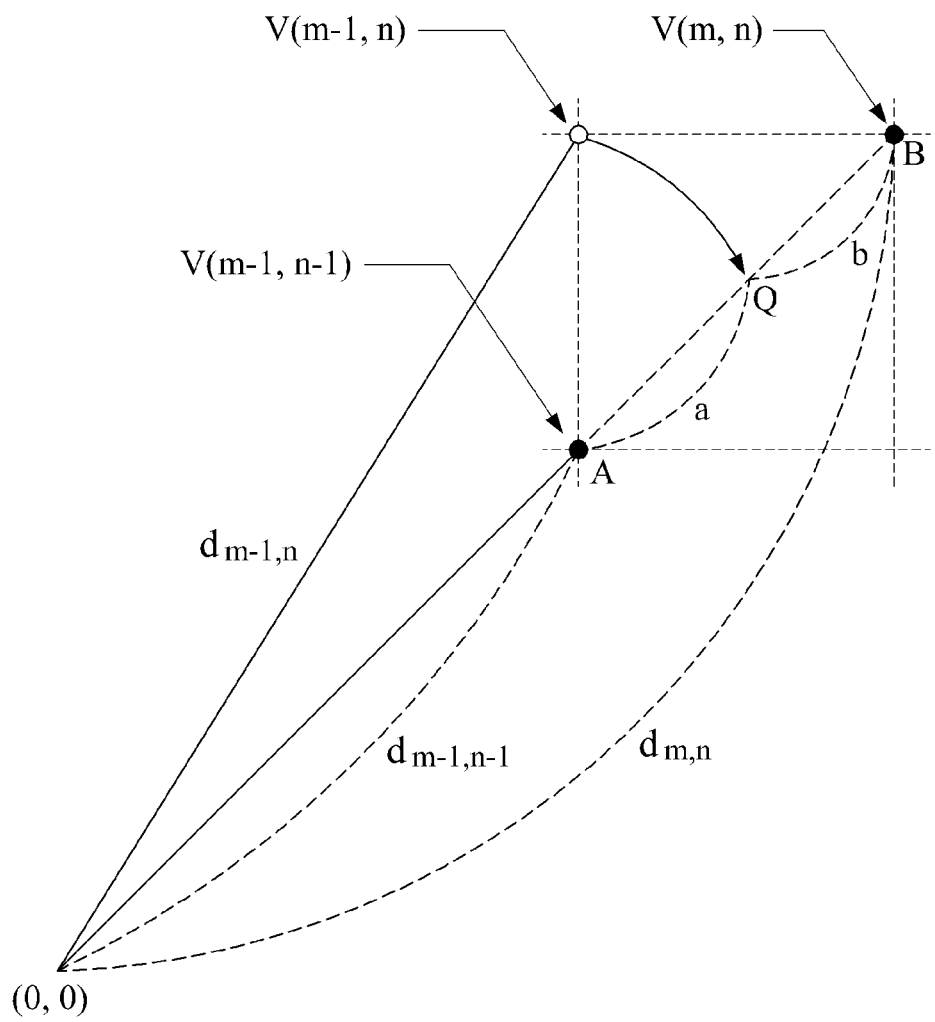
FIG. 7 illustrates a process of calculating a pattern value at a point according to example embodiments.

FIG. 7 illustrates a process of calculating a pattern value at a point according to example embodiments.

In the abovementioned equations, when Q is a point that is distant from the origin by $d_{m-1,n}$, and positioned on a line $\overrightarrow{AB}$, Equations 11 and 12 may be completed with respect to m,n≥1.

$$a = |\overrightarrow{AQ}| = d_{m-1,n} - d_{m-1,n-1} = \frac{(2n-1)\delta_\eta^2}{2z_p}$$ [Equation 11]

$$b = |\overrightarrow{QB}| = d_{m,n} - d_{m-1,n} = \frac{(2m-1)\delta_\xi^2}{2z_p}$$ [Equation 12]

Also, let a hologram pattern value at a point A be V(m−1, n−1), and a hologram pattern value at a point B be V(m,n). A hologram pattern value V(m−1, n) at a point P which is yet to be calculated may be calculated by linear interpolation, as expressed by Equation 13.

[Equation 13]

$$V(m-1,n) = \frac{\frac{(2m-1)\delta_\xi^2}{2z_p}V(m-1,n-1) + \frac{(2n-1)\delta_\eta^2}{2z_p}V(m,n)}{\frac{(2m-1)\delta_\xi^2}{2z_p} + \frac{(2n-1)\delta_\eta^2}{2z_p}}$$

$$= \frac{(2m-1)\delta_\xi^2 V(m-1,n-1) + (2n-1)\delta_\eta^2 V(m,n)}{(2m-1)\delta_\xi^2 + (2n-1)\delta_\eta^2}$$

A process of performing the aforementioned process iteratively, using points for which pattern values are pre-calculated with respect to points for which pattern values are yet to be calculated, may correspond to recurrent interpolation that is mentioned throughout the present disclosure.

The above described process may be performed in parallel by processors included in the calculation unit 130 of FIG. 1, which will be described in detail later.

FIGS. 8 and 9A through 9D illustrate a process of recurrent interpolation according to example embodiments.

Figure 9A:
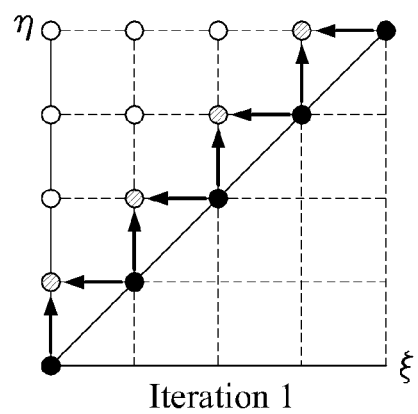
Figure 9B:
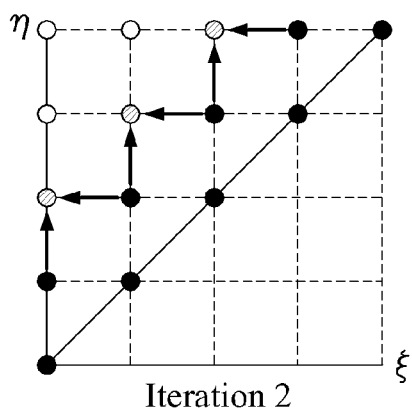
Figure 9C:
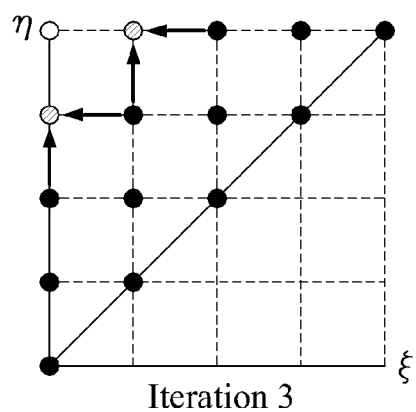
Figure 9D:
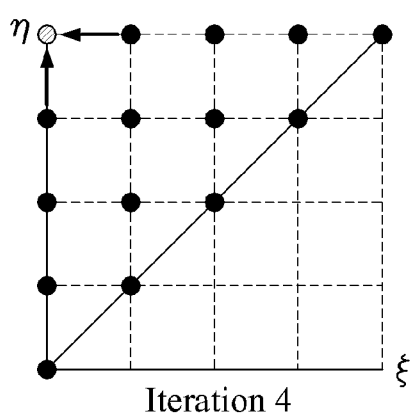

As shown in FIG. 8, V(m−1, n) may be obtained from V(m,n) and V(m−1, n−1), with respect to predetermined values of m and n, and pattern values for points included in a one-eighth area may be calculated through Iteration 1 of FIG. 9A, Iteration 2 of FIG. 9B, Iteration 3 of FIG. 9C, and Iteration 4 of FIG. 9D.

Although linear interpolation is used as an example for ease of description, it may be possible to recurrently perform higher order interpolation to obtain a more accurate hologram pattern value. In addition, it will be understood that various changes in form and details may be made therein without departing from the spirit and scope of the present disclosure.

Figure 10:
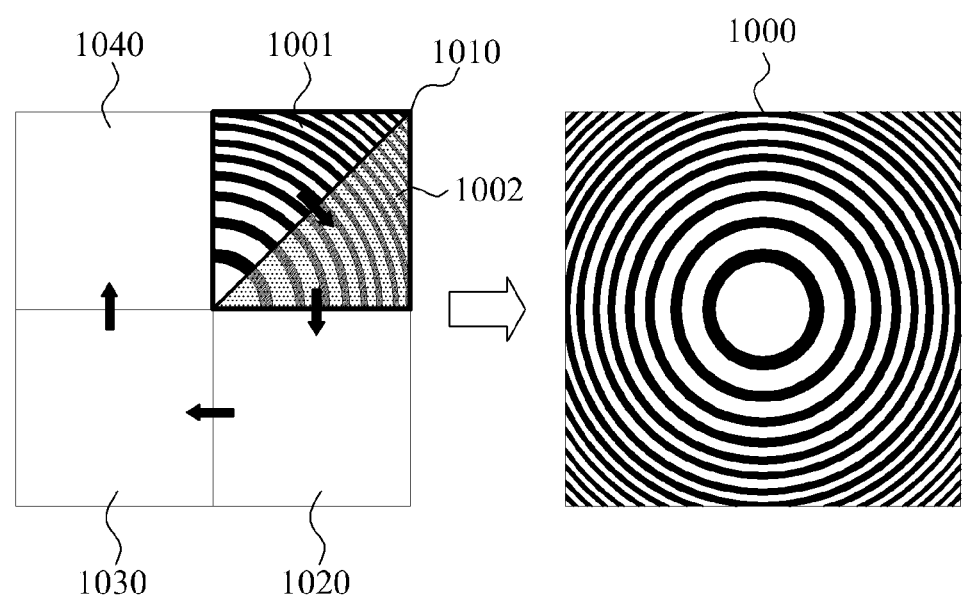
FIG. 10 illustrates a process of generating a pattern for an entire area by duplicating a pattern for a partial area according to example embodiments.

FIG. 10 illustrates a process of generating a pattern for an entire area by duplicating a pattern for a partial area of the entire area according to example embodiments.

The pattern duplicating unit 140 of FIG. 1 may duplicate a pattern for a one-eighth area 1001 generated by the calculation unit 130 to a neighboring one-eighth area 1002 for which a pattern is yet to be generated, by recurrent interpolation.

A pattern for a quarter area 1010 may be completed, and the pattern duplicating unit 140 may duplicate the pattern for the quarter area 1010 to another neighboring quarter area 1020.

By iterating the process, the pattern duplicating unit 140 may complete patterns for other quarter areas 1030 and 1040, and may complete a pattern 1000 for an entire area.

Figure 11B:
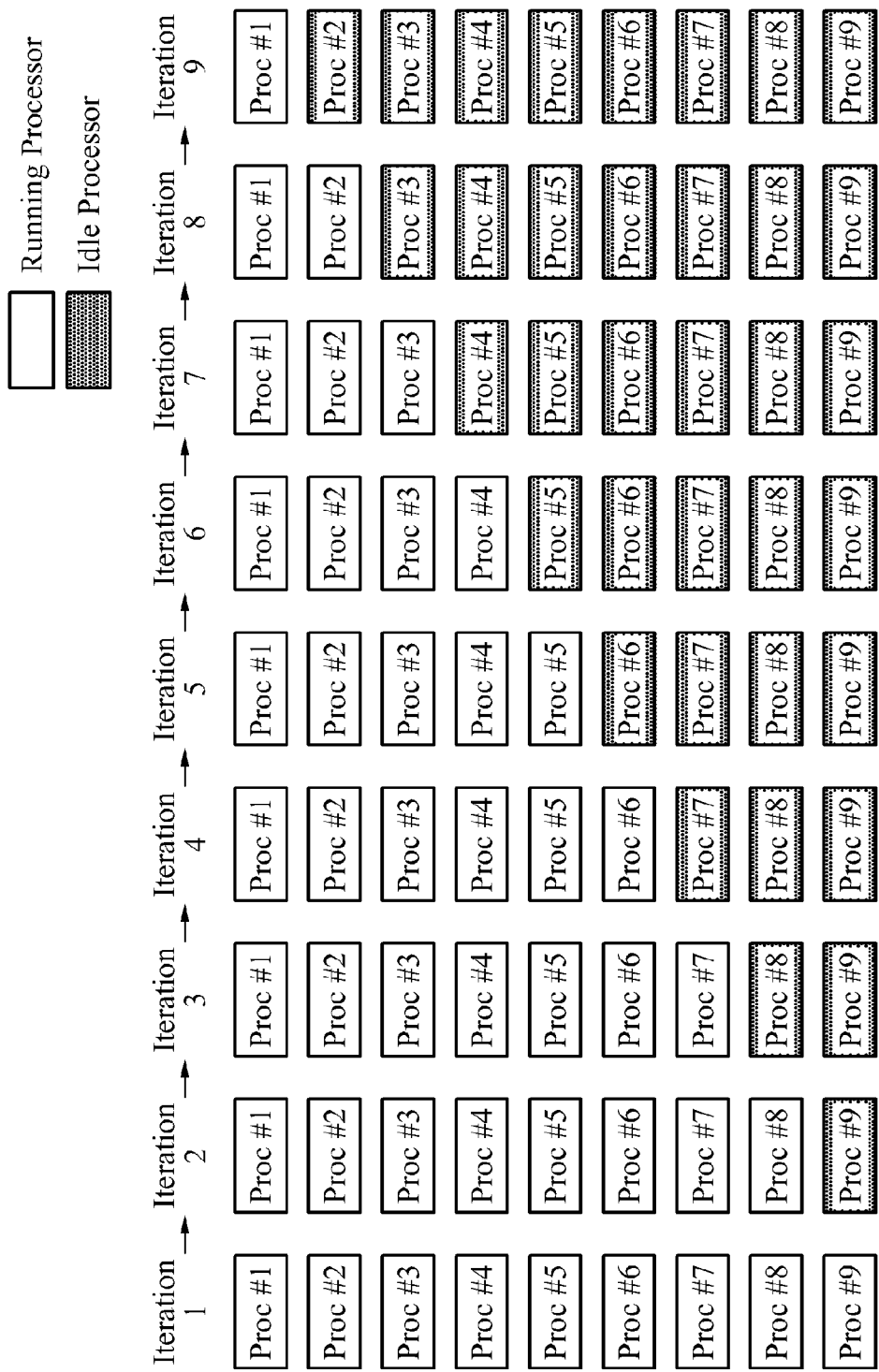

FIGS. 11A and 11B illustrate operational states of processors of FIG. 8 according to example embodiments.

A process of generating patterns for all points in a one-eighth area may be performed by sequential computation of one processor included in the calculation unit 130 of FIG. 1.

However, the process of generating the patterns for all points in the one-eighth area may be performed by parallel computation of a plurality of processors included in the calculation unit 130.

FIG. 11A illustrates a process of performing recurrent interpolation computing in parallel by a plurality of processors, for example, Proc #1 through Proc #9. FIG. 11B illustrates operational states of the plurality of processors while the process of FIG. 11A is performed.

Because a number of idle processors may increase as the iterations are performed iteratively in the parallel process, improvement in efficiency may be demanded.

According to other example embodiments, separate scheduling may be performed to increase a computing rate by reducing a number of idle processors.

FIGS. 12A through 13C illustrate a process of recurrent interpolation performed by a scheduling method, and operational states of processors in the process according to example embodiments.

Figure 12A:
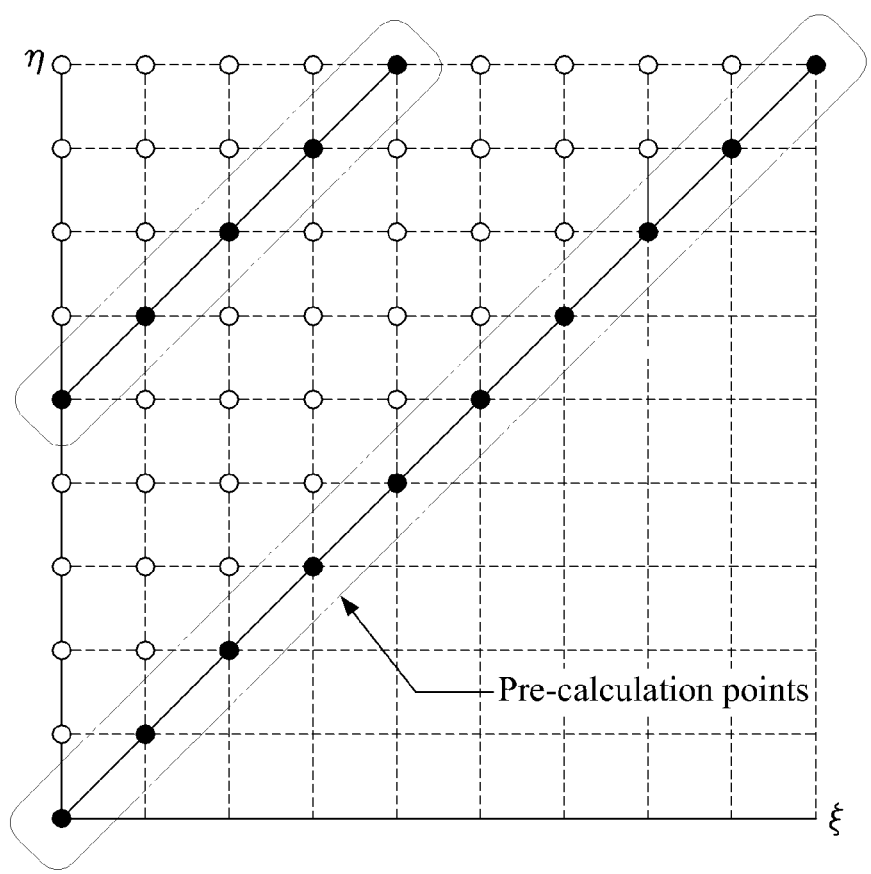
FIGS. 12A through 13C illustrate a process of recurrent interpolation performed by a scheduling method, and operational states of processors in the process according to example embodiments.
Figure 12B:
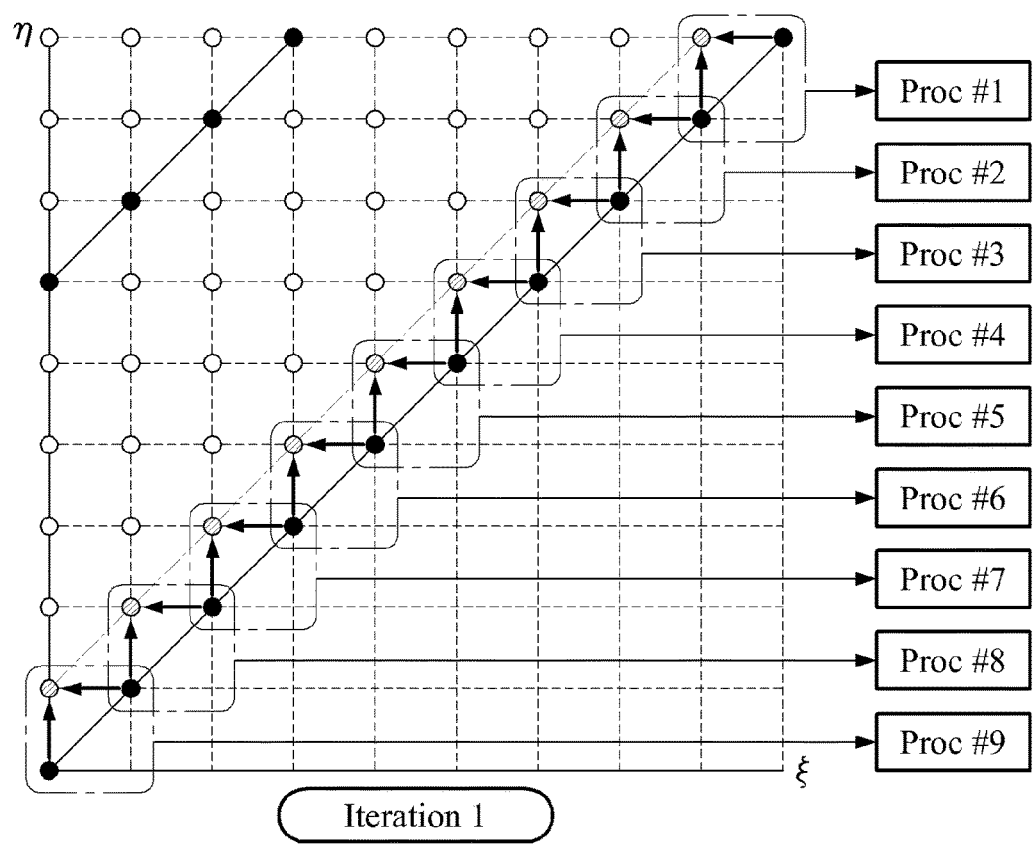
Figure 12D:
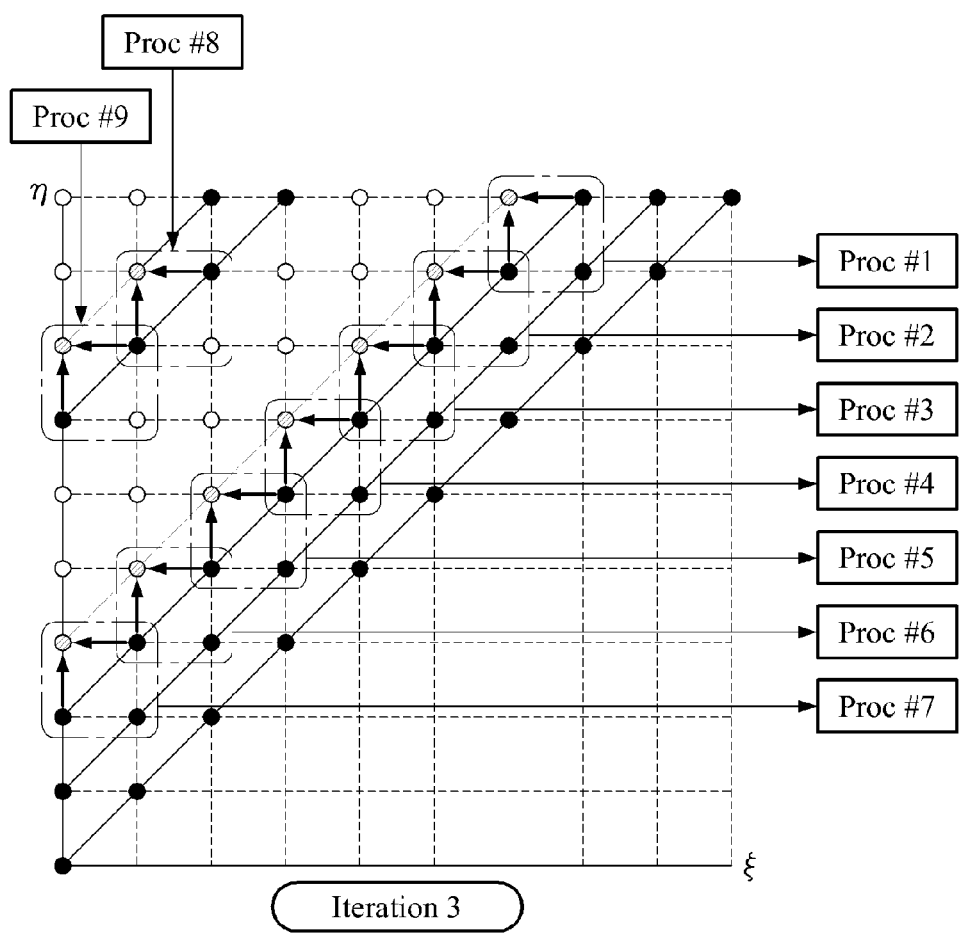
Figure 13A:
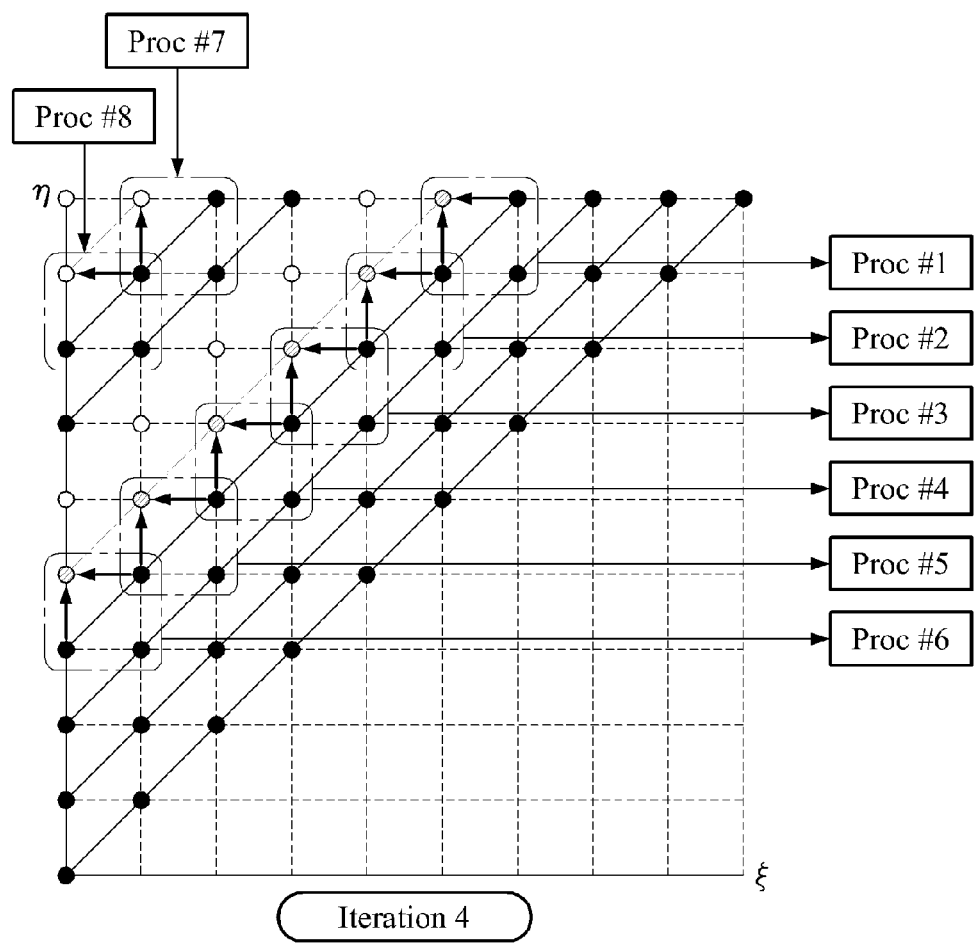
Figure 13B:
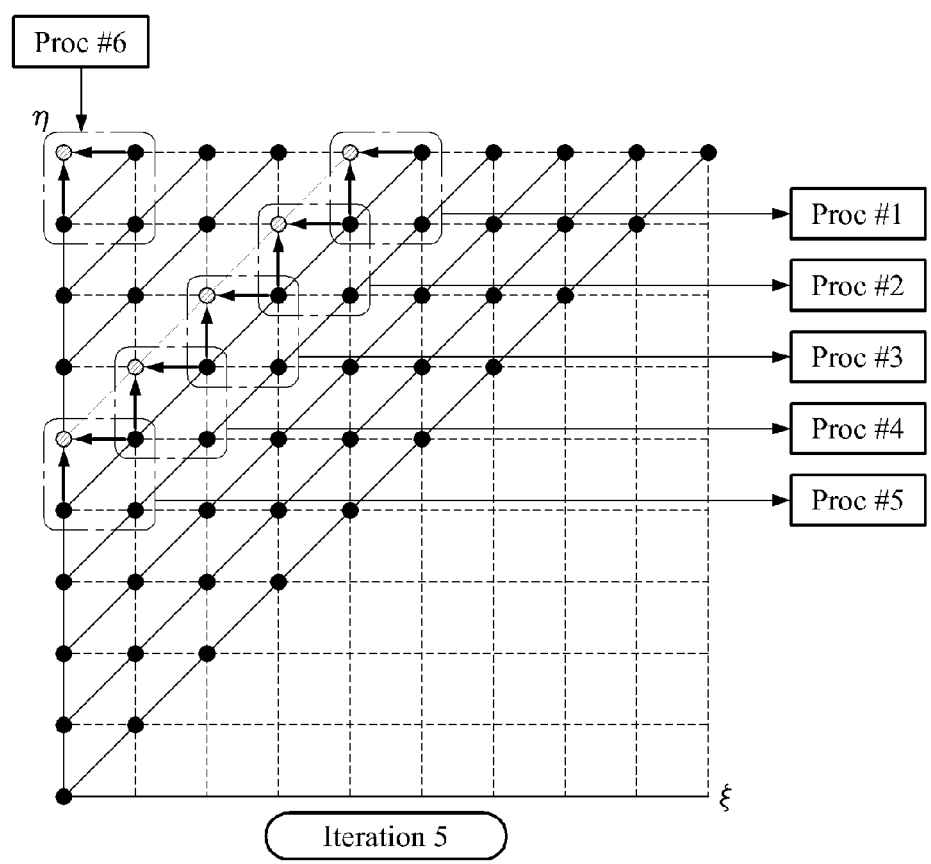

The scheduling unit 120 of FIG. 1 may set points for which pattern values may be pre-calculated, as shown in FIG. 12A.

When the iterations are performed, recurrent interpolation may be allocated to processors, for example, Proc #1 through Proc #9, as shown in FIGS. 12B through 12D, and FIGS. 13A and 13B.

Figure 13C:
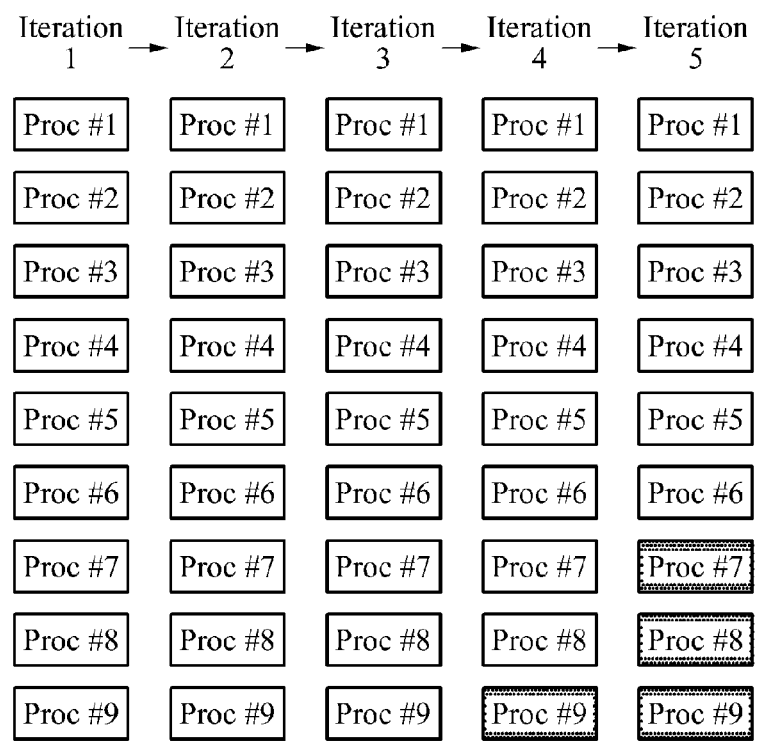

Operational states of the processors may be shown in FIG. 13C.

When compared to the operational states of FIG. 11B, it may be understood that a number of idle processors is remarkably reduced, and an overall number of iterations performed is reduced as well.

FIG. 14 illustrates a method of generating a hologram according to example embodiments.

In operation 1410, a process of generating a 3D hologram image may be initiated, and memory allocation and hologram initialization may be performed.

In operation 1420, the apparatus 100 of FIG. 1 for generating a hologram may generate a hologram using 3D point data when the 3D point data is received.

In operation 1430, the pattern setting unit 110 of FIG. 1 may determine a size of an FZP pattern, which is an interval of a point for which a pattern value is to be actually calculated, and the like.

In operation 1440, the calculation unit 130 of FIG. 1 may calculate pattern values for reference points to calculate the pattern values directly.

In operation 1450, the calculation unit 130 may generate an FZP pattern in a one-eighth area using recurrent interpolation. The calculation process performed by the recurrent interpolation may be identical to the description provided with reference to FIGS. 6 through 9. The recurrent interpolation will be described later based on a flowchart of FIG. 15.

In operation 1460, the pattern duplicating unit 140 may duplicate the FZP pattern for the one-eighth area that is generated by the calculation unit 130, whereby patterns for other one-eighth areas or patterns for other quarter areas may be completed. This process may be identical to the description provided with reference to FIG. 10 and thus, a duplicated description will be omitted for conciseness.

In operation 1470, the FZP patterns generated thus far may be added as a hologram pattern. Whether an additional hologram pattern is to be generated may be determined in operation 1480, and the process of operations 1420 through 1470 may be iterated, as necessary.

FIG. 15 illustrates recurrent interpolation in a method of generating a hologram according to example embodiments.

In operation 1510, a size of an FZP pattern may be determined by the pattern setting unit 110 of FIG. 1. In this process, a pixel pitch regarding how precisely a pattern is to be generated may be determined.

In operation 1520, memory allocation and FZP pattern initialization may be performed. A process of calculating pattern values for reference points in operation 1530 may be similar to the flowchart of FIG. 14.

In operations 1540 through 1580, pattern values may be calculated for points, which neighbor the reference points and for which pattern values are yet to be calculated, through recurrent interpolation, by sequentially increasing a number of iterations.

When the iterations are terminated, the calculated pattern values may be stored in operation 1590, and a process of generating a pattern for an entire area may be performed by the pattern duplicating unit 140 of FIG. 1.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus, comprising:
   a calculation unit configured to generate a pattern for a partial area using input data and Rayleigh-Sommerfeld solution, wherein the partial area corresponds to a portion of an entire area for which a hologram pattern is to be generated, wherein a size of the pattern is an interval of a point for which a pattern value is to be calculated, and wherein the pattern is a Fresnet Zone Plate (FZP) pattern; and
   a pattern duplicating unit configured to complete a pattern for the entire area by duplicating the generated pattern for the partial area.

2. The apparatus of claim 1, wherein the calculation unit is configured to generate the pattern for the partial area by calculating pattern values for a portion of reference points and calculating pattern values for other points excluding the reference points.

3. The apparatus of claim 1, wherein the partial area corresponds to a one-eighth area of the entire area.

4. The apparatus of claim 1, wherein the calculation unit is further configured to calculate FZP pattern values for reference points in the partial area, and calculate FZP pattern values for points excluding the reference points in the partial area, by performing interpolation using an FZP pattern value calculated for a point, among the reference points.

5. The apparatus of claim 4, wherein the calculation unit calculates the FZP patter values for the reference points, using a solution of a wave equation.

6. The apparatus of claim 4, wherein the calculation unit calculates the FZP patter values for points present on a 1-dimensional line in a single direction.

7. The apparatus of claim 1, wherein
   the calculation unit comprises processors to perform parallel recurrent interpolation to generate the pattern, and
   the apparatus further comprises a scheduling unit configured to perform scheduling for the parallel recurrent interpolation with respect to the processors.

8. The apparatus of claim 7, wherein the processors perform the recurrent interpolation by generating the pattern iteratively, using points for which pattern values are pre-calculated with respect to points for which patter values are yet to be calculated.

9. The apparatus of claim 1, further comprising:
   a pattern setting unit configured to select the partial area from the entire area, and to determine a size of a pattern in the partial area.

10. The apparatus of claim 1, wherein, to generate the pattern, the calculation unit is configured to calculate the pattern using a plurality of points on a 1-dimensional line.

11. The apparatus of claim 1, wherein, to generate the pattern, the calculation unit is configured to iteratively generate the pattern for the partial area.

12. A method, comprising:
   generating, by a calculation unit of a hologram generating apparatus, a pattern for a partial area using input data and Rayleigh-Sommerfeld solution, wherein the partial area corresponds to a portion of an entire area for which a hologram pattern is to be generated, wherein a size of the pattern is an interval of a point for which a pattern value is to be calculated, and wherein the pattern is a Fresnel Zone Plate (FZP) pattern and the pattern is a Fresnel Zone Plate (FZP) pattern; and
   completing, by a pattern duplicating unit of the hologram generating apparatus, a pattern for the entire area by duplicating the generated pattern for the partial area.

13. The method of claim 12, wherein the generating of the patter comprises calculating FZP pattern values for reference points in the partial area, and calculating FZP pattern values for points excluding the reference points in the partial area, by performing interpolation using an FZP pattern value calculated for a point, among the reference points.

14. The method of claim 13, wherein the generating of the patter further comprises calculating the FZP pattern values for the reference points using a solution of a wave equation.

15. The method of claim 12, further comprising:
  performing, by a scheduling unit of the hologram generating apparatus, scheduling for parallel recurrent interpolation to generate the pattern with respect to processors included in the calculation unit.

16. A non-transitory computer-readable medium comprising a program configured to instruct a processing device to implement the method of claim 12.

17. The method of claim 12, wherein the generating of the patter includes iteratively generating the pattern for the partial area.

* * * * *